United States Patent [19]

Bell et al.

[11] 4,174,329

[45] Nov. 13, 1979

[54] ALKYD RESINS MODIFIED WITH TETRAFLUOROETHYLENE ADDUCT OF CONJUGATED TRIGLYCERIDES

[75] Inventors: Edward W. Bell, Peoria; Lyle E. Gast, Harvard, both of Ill.

[73] Assignee: The United States of America as represented by the Secretary of Agriculture, Washington, D.C.

[21] Appl. No.: 918,892

[22] Filed: Jun. 26, 1978

[51] Int. Cl.$^2$ .......................... C09D 3/34; C09D 3/64
[52] U.S. Cl. .............................. 260/22 XA; 260/22 R; 260/408
[58] Field of Search ................. 260/22 R, 22 XA, 408

[56] References Cited

U.S. PATENT DOCUMENTS

| | | | |
|---|---|---|---|
| 2,188,882 | 1/1940 | Clocker | 260/404.8 |
| 2,206,171 | 7/1940 | Ellis | 260/404.8 |
| 3,485,779 | 12/1969 | Gast et al. | 260/18 TN |

OTHER PUBLICATIONS

L. B. Falkenburg et al., Journal of American Oil Chemists' Society, vol. 25, pp. 237–240 (1948).
W. R. Miller et al., Journal of American Oil Chemists' Society, vol. 39, No. 3, pp. 173–176 (1962).
E. J. Dufek et al., Journal of American Oil Chemists' Society, vol. 42, No. 12, pp. 1060–1062, Dec., 1965.
E. W. Bell et al., Journal of American Oil Chemists' Society, vol. 42, No. 5, pp. 388–392 (1968).
Gast et al., J. Amer. Oil Chem. Soc., vol. 46, No. 7, pp. 360–364 (1969).

*Primary Examiner*—Ronald W. Griffin
*Attorney, Agent, or Firm*—M. Howard Silverstein; David G. McConnell; Curtis P. Ribando

[57] ABSTRACT

Cycloaddition reaction products of tetrafluoroethylene and conjugated triglyceride oils have been prepared and used in the modification of alkyd resins. Clear exterior coatings formulated from these resins are characterized by superior durability properties, including resistance to checking, cracking, flaking, and erosion.

7 Claims, No Drawings

ALKYD RESINS MODIFIED WITH TETRAFLUOROETHYLENE ADDUCT OF CONJUGATED TRIGLYCERIDES

BACKGROUND OF THE INVENTION 1. Field of the Invention

This invention relates to triglyceride oil adducts useful in the preparation of clear, alkyd coating compositions, and to coating compositions prepared therefrom.

2. Description of the Prior Art

Alkyds containing triglyceride oil fatty acids have long been important as vehicles in protective coatings for exterior use on wood and other materials. Improvement of certain of their durability properties, including resistance to checking, cracking, flaking, erosion, and others, has been attempted by chemical modification of the basic alkyd.

For example, Miller et al. [J. Amer. Oil Chem. Soc. 39(3): 173-176 (1962)] teaches cyclization of linseed oil fatty acids and modification of alkyd resins therewith. Films prepared from these resins compared favorably with natural acid resins but only when the modifier contained relatively high levels (ca. 78%) of pure cyclic acids.

Another approach was taken by Gast et al., U.S. Pat. No. 3,485,779 and Gast et al., J. Amer. Oil Chem. Soc. 46(7): 360-364 (1969). These references teach the preparation of coating compositions by the modification of vegetable oils to urethane polyesteramides. These were prepared by first converting the vegetable oils with excess diethanolamine to their corresponding N,N-bis (2)-hydroxyethyl fatty amides and glycerol. The isolated amides were then reacted with dibasic acids or anhydrides at 140°-150° C. for 6-24 hours to yield the hydroxy-terminated polyestermides, which were finally modified with diisocyanate. Schneider et al., J. Paint Technol. 44(575): 58-63 (1972) later demonstrated a feasible commercial method to prepare the urethane polyesteramides in which the isolation of the intermediate hydroxyamides is eliminated. Nonetheless, the complexity of the procedure reduces the commercial attractiveness of the resulting coating compositions.

Likewise, other attempts to improve the durability of clear coatings by modification of the oil vehicles have met with only limited success.

SUMMARY OF THE INVENTION

We have now unexpectedly discovered that alkyd resins, prepared from novel cycloaddition reaction products of tetrafluoroethylene (TFE) conjugated triglyceride oils can be formulated into clear coating compositions having superior durability properties under exterior exposure conditions.

In accordance with this discovery, it is an object of the invention to prepare novel TFE adducts of triglyceride oils having conjugated sites of unsaturation.

It is also an object of the invention to employ these adducts in the modification of alkyd resins.

Another objects of this invention is to formulate these alkyd resins into coating compositions which will produce a durable exterior clear finish.

A further object of the invention is to provide clear, alkyd resin coating compositions which can be prepared from triglyceride oils by a relatively simple procedure.

Other objects and advantages of this invention will become readily apparent from the ensuing description.

DETAILED DESCRIPTION OF THE INVENTION

The triglyceride oils useful as starting materials in this invention include those which can be readily isomerized to the degree that at least about 15% of the fatty acids contained therein have conjugated sites of unsaturation, usually as conjugated dienes and trienes. Linseed oil is the preferred choice, though it is understood that soybean oil, fish oil, tall oil, oiticica oil, and others having at least 15% fatty acids with two or more sites of unsaturation could be substituted as substantial equivalents thereof. The nonconjugated linoleate, linolenate, and licanate moieties of the triglycerides may be isomerized by any conventional means to obtain the desired level of conjugation. An exemplary procedure using anthraquinone at the 5% level is taught by Falkenburg et al. [J. Amer. Oil Chem. Soc. 25: 237 (1948)], herein incorporated by reference. The conjugated triglyceride oil is a positional isomer of the staring material and has substantially the same degree of unsaturation.

The novel TFE adducts of the isomerized oils are prepared by cycloaddition of the TFE to the conjugated oils. The predominant reaction is 1,2-cycloaddition across one of the conjugated double bonds as follows:

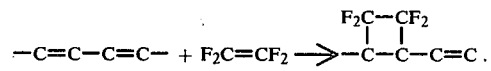

However, the reaction is sometimes accompanied by a minor proportion of 1,4-cycloaddition yielding a cyclohexene structure. The reaction conditions are substantially the same as those taught by Bell et al. [J. Amer. Oil Chem. Soc. 45: 388-392 (1968)] for 1,2-cycloaddition of haloalkenes to conjugated fatty acids and their methyl esters. The preferred conditions include temperatures in the range of about 200°-250° C. at autogenous pressure for about 5-5.5 hours. It is desirable to employ an inert solvent, such as 2,2,4-trimethyl pentane, to serve as a diluent and to diminish the possibility of violent decomposition. Any well-known polymerization inhibitor, such as hydroquinone, should also be added to the reaction mixture.

In general, the reaction should be conducted with a sufficient excess of TFE such that cycloaddition occurs at substantially each set of conjugated double bonds. At least a 10 mole percent excess of TFE is preferred. We surprisingly found that when levels on the order of 33 mole percent excess of TFE are reacted with linseed oil, the yield of cycloadducts is about 115% based upon the conjugated diene and triene content of the starting material. These results were unexpected from the teachings of Bell et al., supra, which indicate that the use of more than a 20 mole percent excess of haloalkenes with respect to the conjugated fatty acid did not improve the yield of cycloadduct. It is also taught in Bell et al. that there is no noticeable formation of cyclaaddition products from monoene (methyl oleate) or from nonconjugated diene. Similarly, we have observed that TFE does not react with nonconjugated linseed oil, neither at the above-described conditions, nor at temperatures as high as 295° C.

The alkyd resins of the invention are prepared by reacting the TFE adduct with glycerol and an anhydride. The preferred anhydride is phthalic, though other aryl or aliphatic anhydrides having at least four carbon atoms could be substituted as substantial equivalents thereof. Included for example are succinic, maleic, tetrahydrophthalic, endic, and others. Based upon the TFE adduct, it is contemplated that the molar ratio of glycerol be in the range of 2:1–6:1 and the molar ratio of anhydride be in the range of 3:1–9:1.

The reaction is conducted in two stages. The first stage is an alcoholysis reaction between the TFE adduct and the glycerol. These components are heated together at temperatures of about 200°–250° C. for 1–2 hours in the presence of an effective amount of basic catalyst such as calcium hydroxide. In the second stage, the anhydride is added to the alcoholysis product, and the reaction is continued at the same temperatures for 1–2 hours.

The recovered resins have a viscous consistency and must be diluted with a suitable solvent in the formulation of the clear coating compositions. Any conventional coating composition solvent or solvent mixture may be used provided that it is compatible with the resin. Mineral spirits, xylene, and toluene are commonly used alone or in admixture. The amount of added solvent is of course dependent upon the initial viscosity of the resin and the desired coating consistency. Generally, the resin:solvent weight ratio will range from about 1:2 to about 2:1.

Drying time and film hardness may be controlled by admixture with other alkyd resins, drying agents, or other conventional additives as known in the art. Unmodified safflower oil and soybean oil alkyd resins have the effect of shortening the drying time when admixed with the alkyd resins of the instant invention.

The coatings may be applied to wood, metal, or other substrates by casting, brushing, or spraying. They are then air dried at ambient or elevated temperatures, and may optionally be baked at temperatures up to about 150° C.

Formulations in which the novel TFE alkyd resins constitute at least about 50% by weight of the solids content are characterized by nearly complete resistance to common forms of stress failure; namely, checking, cracking, flaking, erosion, mildew, etc., for periods of up to 21 months. The results of exposure tests are given below in the examples and tables.

The following examples are intended only to further illustrate the invention and are not intended to limit its scope which is defined by the claims.

EXAMPLE 1

A. Isomerization of Linseed Oil

A 1-liter round-bottom flask fitted with a magnetic stirrer, nitrogen inlet tube, temperature controller, and exit gas trap (containing linseed oil) was charged with 400 g. of linseed oil (Supreme 1248, $N_D 30$ 1.4762) and 20 g. (5% by weight) anthraquinone. The flask was heated to 250° C. and a very slow nitrogen sweep was maintained. After 3 hours the heat was removed. The reaction mixture was diluted with 500 ml. hexane and filtered to remove the anthraquinone. Analysis of the conjugated linseed oil was as follows:

UV analysis (% by weight):
 diene —18.2%
 triene —1.9%
 tetraene —0.1%
IR analysis (% by weight):
 trans —18.3%
 trans-cis —2.3%
 trans-trans —9.0%

B. Preparation of Tetrafluoroethylene Adduct of Conjugated Linseed Oil.

A 500-ml. stainless-steel Magne-Dash autoclave was charged with 323.2 g. (0.058 mole linoleate and 0.189 mole linolenate) of the isomerized linseed oil prepared in Example 1A and with 3 g. hydroquinone. The autoclave was sealed, swept with nitrogen, and evacuated with house vacuum. TFE (32.8 g., 0.328 mole) was then added directly to the reactor from a cylinder. The autoclave was heated with constant stirring to 250° C. Internal autogenous pressures were measured to be 230 p.s.i. at 24° C., 360 p.s.i. at 205° C. (maximum attained), and 275 p.s.i. at 250° C. After 5.5 hours at 250° C., the pressure was 40 p.s.i. After cooling, the autoclave was slowly vented. The contents were diluted with hexane, transferred to a beaker, and warmed on a steam bath in a well-ventilated hood to expel unreacted TFE. The solvent was removed in a rotary vacuum evaporator. A sample was analyzed, and the calculated yield of cycloadducts was 35% based upon linoleate plus linolenate content, or 115% based upon the conjugated diene and triene content of the starting material.

EXAMPLE 2

Preparation of Alkyd Resin Modified with TFE Adduct of Linseed Oil.

Stage 1:
A three-neck 500-ml. round-bottom flask fitted with a glass-"Teflon" stirrer, nitrogen inlet, and air-cooled condenser was charged with 167.0 g. (0.18 mole) TFE adduct of linseed oil prepared in Example 1B and 52.7 g. glycerol (0.57 mole). The stirred mixture was heated to 107° C. and 0.12 g. Ca(OH)$_2$ (0.12% Ca based on the weight of the glycerol) was added. Heating was continued to 230°–235° C. Alcoholysis was completed in 85 minutes.

Stage 2:
107.7 g. phthalic anhydride (0.73 mole) was added and heating continued. The temperature initially dropped to 200° C. and then rose to 230° C. in about 1 hour. The reaction was terminated after about 1½ hours. The recovered alkyd resin had an acid value of 35.4 and an oil length of 49%.

A series of coating formulations was prepared for use in the ensuing examples. A description of each is given in Table I.

Table I

| Formulation | Coating composition[a] | Solvent[b] | Solids content | Drier level (wt. %) 6% Co naphthenate | Drier level (wt. %) 24% Pb naphthenate | Antiskinning agent level (wt. %) (AOB "Exkin" #2) |
|---|---|---|---|---|---|---|
| A[c] | TFE | m.s. | 50 | — | — | — |
| B[c] | SFO | m.s. | 70 | — | — | — |
| C | TFE/SFO (1:1) | m.s./xy (1:1) | 41 | — | — | — |
| D | TFE | m.s./xy (2:1) | 40 | 0.01 | 0.5 | 0.2 |
| E | SFO | m.s. | 40 | 0.01 | 0.5 | 0.2 |
| F | TFE/SFO (1:1) | m.s./xy (1:1) | 40 | 0.01 | 0.5 | 0.2 |

Table I-continued

| Formulation | Coating composition[a] | Solvent[b] | Solids content | Drier level (wt. %) 6% Co naphthenate | Drier level (wt. %) 24% Pb naphthenate | Antiskinning agent level (wt. %) (AOB "Exkin" #2) |
| --- | --- | --- | --- | --- | --- | --- |
| G | TFE/SFO (1:1) | m.s./xy (1:1) | 41 | 0.01 | 0.5 | 0.2 |
| H | Urethane control | m.s. | 45 | 0.01 | — | 0.2 |
| I | Urethane control | m.s. | 40 | 0.01 | 0.5 | 0.2 |

[a]TFE = Alkyd resin modified to 49% oil length with tetrafluoroethylene adduct of linseed oil.
SFO = Commercial long oil alkyd resins modified to 65% oil length with safflower oil (Pacific Vegetable Oil Corporation, Richmond, Ca).
Urethane control = Commercial clear coating of toluene diisocyanate modified with linseed oil (Spencer Kellogg Division of Textron, Inc., Buffalo, N.Y.).
[b]m.s. = Mineral spirits; xy = xylene.
[c]Used for preparation of formulations C-G.

EXAMPLE 3

Table II

| | | | | Accelerated Exposure Test Ratings[a] | | | | | | | |
| --- | --- | --- | --- | --- | --- | --- | --- | --- | --- | --- | --- |
| Example | Formulation | Coating composition[b] | Time (hr.) | General appearance | Checking | Cracking | Flaking | Erosion | Color[c] | Gloss | Water spotting |
| 6A | D | PFE | 600 | 10 | 10 | 10 | 10 | 10 | 6 Dk | 10 | 6 |
| 7A | E | SFO | 600 | 10 | 10 | 10 | 10 | 10 | 8 Bl | 10 | 10 |
| 8A | F | TFE/SFO | 600 | 10 | 10 | 10 | 10 | 10 | 6 Dk | 10 | 10 |
| 9A | H | Control | 600 | 5 | 10 | 10 | 10 | 5 | 5 Dk | 4 | — |
| 6B | D | TFE | 1000 | 6 | 10 | 10 | 10 | 7 | 4 Dk | 6 | 5 |
| 7B | E | SFO | 1000 | 7 | 10 | 8 | 10 | 7 | 6 Bl | 8 | 7 |
| 8B | F | TFE/SFO | 1000 | 6 | 10 | 6 | 10 | 6 | 5 Dk | 6 | 7 |
| 9B | H | Control | 1000 | 4 | 10 | 10 | 10 | 4 | 4 Dk | — | — |

[a]Ratings: 10=no change; 8=slight change; 6=moderate change; 4=considerable change; 2=severe change.
[b]See Table I.
[c]Dk=darkening; Bl=bleaching.

Formulation A having a Gardner-Holdt viscosity of Z6+ was cast as a thin film on a glass plate. The film was baked at 230° F. for 0.5 hour, and it formed a hard, glossy coating.

EXAMPLE 4

Formulation C having a Gardner-Holdt viscosity of R was cast as a 4-mil. thick film on a glass plate. Under ambient conditions, the film dried to a slightly cloudy, tacky coating in about 24 hours.

EXAMPLE 5

The procedure of Example 4 was repeated except that the cast film was baked at 230° F. for 0.5 hour and formed a hard, glossy, clear coating.

EXAMPLES 6-9

Each of four beveled siding panels of red cedar wood was painted with a brush-on coat of one of the formulations, D, E, F, and H, and allowed to dry for 8-9 days. The process was repeated until each panel had three coats of the same formulation. The panels were then subjected to accelerated weathering tests in an Atlas twin carbon arc Model DMC Weather-o-Meter. As indicated by the ratings in Table II, formulations D and F containing the TFE resin performed better than the urethane control.

EXAMPLES 10-13

The procedure of Examples 6-9 was repeated in preparing panels coated with formulations D, E, F, and H. These panels were exposed at Miami, Fla., to outdoor weathering tests at a 45° angle, facing south. After 9 months, they were evaluated. As indicated by the ratings in Table III, formulations D and F containing the TFE resin performed overall better than the urethane control, and underwent less color change than the pure SFO alkyd resin.

Table III

| | | | | | Exterior Exposure Test Ratings[a] | | | | | | | | |
| --- | --- | --- | --- | --- | --- | --- | --- | --- | --- | --- | --- | --- | --- |
| Ex. | Formulaton | Coating composition[b] | Time (mo.) | General appearance | Checking | Cracking | Flaking | Erosion | Color[c] | Gloss | Water spotting | Dirt | Mildew |
| 10 | D | TFE | 9 | 8 | 10 | 10 | 10 | 10 | 7 Bl | 10 | 10 | 8 | 10 |
| 11 | E | SFO | 9 | 8+ | 10 | 10 | 10 | 10 | 4 Dk | 10 | 10 | 10 | 10 |
| 12 | F | TFE/SFO | 9 | 8 | 10 | 10 | 10 | 10 | 6 Bl | 10 | 10 | 8 | 10 |
| 13 | H | Control | 9 | 6 | 10 | 8 | 10 | 8 | 7 Dk | 10 | 10 | 10 | 10 |

[a]Ratings: 10=no change; 8=slight change; 6=moderate change; 4=considerable change; 2=severe change.
[b]See Table I.
[c]Dk=darkening; Bl=bleaching.

EXAMPLES 14-15

Beveled siding panels were coated three times with formulations G and I according to the procedure described in Examples 6-9. These panels were exposed at Buffalo, New York, to outdoor weathering tests at a 90° angle, facing south. At intervals of 6, 9, 12, 16, and 21 months, they were evaluated. As indicated by the ratings in Table IV, formulation G containing the TFE resin performed better than the urethane control in substantially all categories.

It is understood that the foregoing detailed description is given merely by way of illustration and that modification and variations may be made therein without departing from the spirit and scope of the invention.

Table IV

| | | | | Exterior Exposure Test Ratings[a] | | | | | | | | | |
|---|---|---|---|---|---|---|---|---|---|---|---|---|---|
| Ex. | Formulation | Coating composition[b] | Time (mo.) | General appearance | Chalking | Checking | Cracking | Flaking | Erosion | Color[c] | Gloss | Water spotting | Dirt | Mildew |
| 14A | G | TFE/SFO | 6 | 9 | 10 | 10 | 10 | 10 | 10 | 10 | 9+ | 10 | 10 | 10 |
| 15A | I | Control | 6 | 6+ | 10 | 10 | 9+ | 10 | 9+ | 8F | 8+ | 10 | 10 | 10 |
| 14B | G | TFE/SFO | 9 | 9 | 10 | 10 | 10 | 10 | 10 | 9Y | 9 | 10 | 10 | 10 |
| 15B | I | Control | 9 | 6+ | 10 | 10 | 8+ | 9 | 5+ | 7F | 7 | 10 | 10 | 10 |
| 14C | G | TFE/SFO | 12 | 9 | 10 | 10 | 10 | 10 | 10 | 9Y | 9 | 10 | 10 | 10 |
| 15C | I | Control | 12 | 2 | 10 | 8 | 7 | 8 | 1 | — | 0 | 10 | 9 | 10 |
| 14D | G | TFE/SFO | 16 | 9 | 10 | 10 | 10 | 10 | 10 | 9Y | 9+ | 10 | 10 | 10 |
| 15D | I | Control | 16 | 2 | 10 | 7 | 6 | 7 | 1 | ? | 0 | 10 | 8 | 10 |
| 14E | G | TFE/SFO | 21 | 8+ | — | 10 | 10 | 10 | 10 | 6F | 9 | 8 | 8 | 10 |
| 15E | I | Control | 21 | 0 | — | — | — | — | 1 | — | — | — | — | — |

[a]Ratings: 10=no change; 8=slight change; 6=moderate change; 4=considerble change; 2=severe change.
[b]see Table I.
[c]F=fading; Y=yellowing.

We claim:

1. A composition comprising the cycloaddition reaction product of a triglyceride oil having sets of conjugated double bonds and a sufficient amount of tetrafluoroethylene with respect to said sets of conjugated double bonds whereby cycloaddition of tetrafluoroethylene in said composition is present at least at substantially each of said sets.

2. The composition as described in claim 1 wherein at least about 15% of the fatty acids of said triglyceride oil have conjugated sites of unsaturation.

3. The composition as described in claim 2 wherein said triglyceride oil is conjugated linseed oil.

4. An alkyd resin composition comprising the reaction product of (1) glycerol, (2) an anhydride, and (3) the cycloaddition reaction product of tetrafluoroethylene and a conjugated triglyceride oil.

5. The composition as described in claim 4 wherein at least about 15% of fatty acids of said triglyceride oil have conjugated sites of unsaturation.

6. The composition as described in claim 5 wherein said triglyceride oil is conjugated linseed oil.

7. The composition as described in claim 6 wherein said anhydride is phthalic anhydride.

* * * * *